United States Patent Office 3,412,557
Patented Nov. 26, 1968

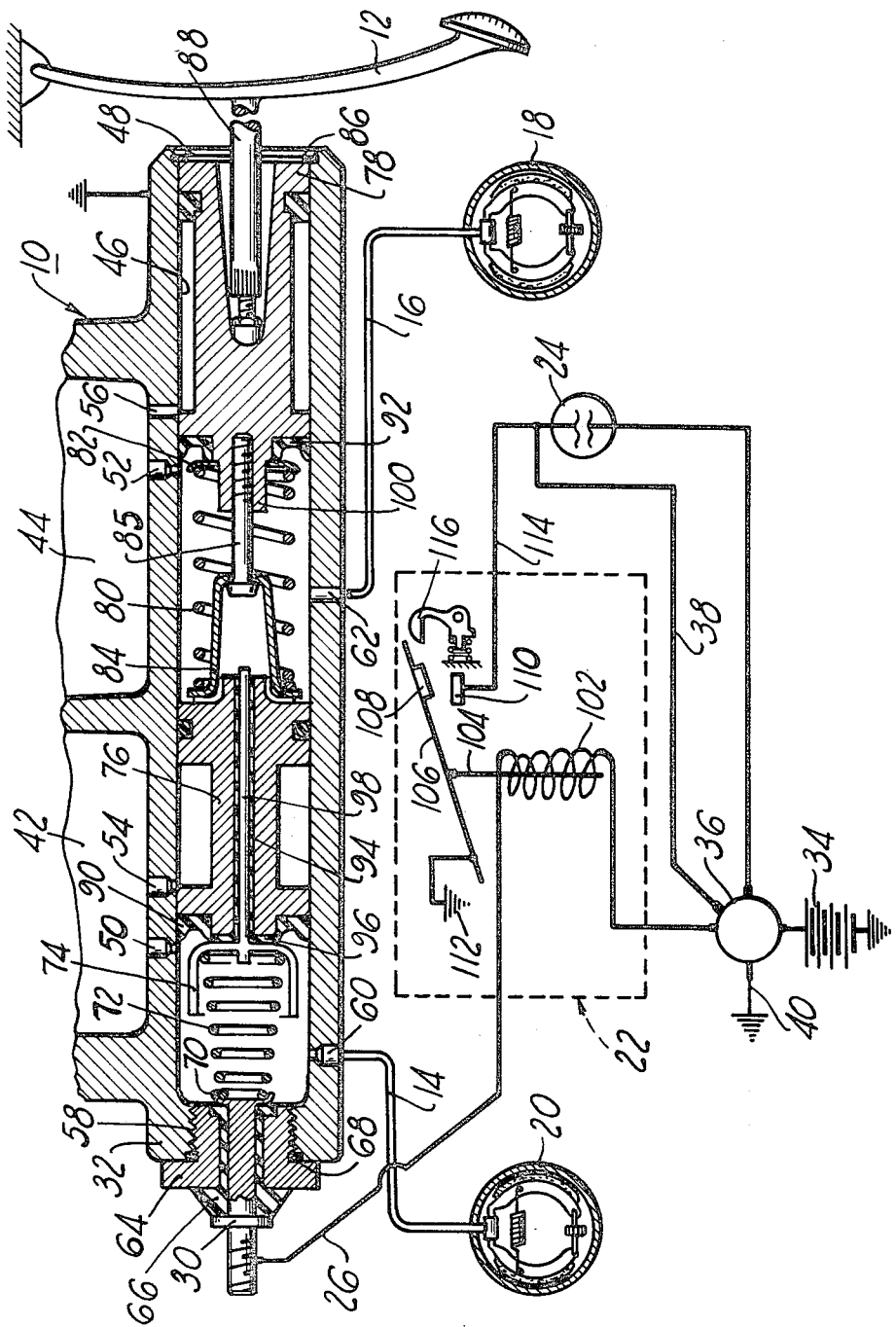

3,412,557
MALFUNCTION INDICATOR FOR FLUID
ACTUATOR
William R. Williams, South Bend, Ind., assignor to The
Bendix Corporation, a corporation of Delaware
Filed Dec. 19, 1966, Ser. No. 602,786
11 Claims. (Cl. 60—54.6)

ABSTRACT OF THE DISCLOSURE

A means carried by a movable wall means and integrated with a housing mounted element to indicate a malfunction in a fluid actuator capable of developing fluid pressures.

Summary

In the field of fluid actuators it has long been desirable to provide indicating means which would provide an operator at a remote location with an adequate knowledge of the functioning or malfunctioning of the fluid pressure actuator. In view of recent developments in the art of master cylinders for actuation of brake systems of automotive vehicles, it has been required that indicator means be provided on master cylinders capable of developing separate pressures for the actuation of the front and rear brakes, respectively. It is a principal object, therefore, of this invention to provide a malfunction indicator for a master cylinder type of fluid pressure actuator. However, it is not to be construed that the invention is limited to this particular use, as will be appreciated by those skilled in the art.

Another object of this invention is to provide an indicating switch means internally of the master cylinder, or fluid pressure actuator.

A still further object of this invention is to provide, in a fluid pressure actuator having first and second movable walls, a three part switch means which is sensitive to the travel of the pistons within the actuator so as to be indicative of a malfunction in the development of pressure by each of the pistons therein.

Drawing description

The single figure of the drawing shows a master cylinder for actuation of vehicle brakes in cross section with a schematic representation of a visual indicating system connected to be operable by the switch means within the master cylinder.

Detailed description

With more particular regard to the figure, there is shown a master cylinder 10 which is operated by a brake pedal 12 for the generation of separate fluid pressures for conduits 14 and 16 leading to front wheel brakes 18 and rear wheel brakes 20 of an automobile. A visual indicating system comprising a latching relay 22 and a light 24 is connected by an electrical lead 26 to a common switch terminal 30 affixed to a housing 32 of the master cylinder.

Before passing on to the internal details of the master cylinder, it should be noted that the power source for the visual indicating system is provided by a battery 34 such as the battery of the automobile that is connected via an ignition switch 36 to the indicating light 24 and to the latching relay 22 and through the latching relay by means of the lead 26 to the common terminal 30 on the master cylinder 10. In addition, a test circuit is provided by connecting a lead 38 to the start terminals of the ignition switch 36 so that the lamp 24 will be connected to a ground lead 40 whenever the switch 36 is placed in the start position for staring the motor of the associated vehicle and thereby momentarily light the lamp 24.

With particular emphasis now on the construction of the master cylinder, the housing 32 is formed preferentially by casting to have reservoir chambers 42 and 44 and a longitudinal bore 46 open as at 48. After casting, compensating ports 50 and 52 are drilled from the reservoirs 42 and 44 into the bore 46 as well as filling ports 54 and 56. Additionally the closed end of the bore 46 is drilled and threaded as at 58, and outlet ports 60 and 62 are also drilled into the bore 46. Thereafter the bore 46 is machined to the desired finish.

After providing the desired finish to the bore, a plug 64 to which the switch terminal 30 is mounted by an insulator 66 is threaded to the housing 32 with a seal 68 compressed between the head of the fitting 64 and the housing to seal the bore 46. The switch terminal 30 is provided with a spring bearing flange 70 that rests against the insulator 66 internally of the bore 46. A conical return spring 72 is inserted between flange 70 and a cup retainer 74 of a floating piston 76 that is fitted within the bore 46. An operator-operated piston 78, having a bolt 85 mounting a cage spring assembly comprising spring 80 and retainers 82 and 84 to it, is abuttingly connected to the floating piston 76, held in the bore by a snap ring 86 in a groove in the housing 32 adjacent the open end 48 of the bore 46. A push rod 88 connects the brake pedal 12 to the operator-operated piston 78.

The floating piston 76 as well as the operator-operated piston 78 are each provided with fore and aft seals with the forward seals 90 and 92, respectively, lying immediately behind the compensating ports 50 and 52, respectively, in the assembled position within the bore 46 and ahead of the filling ports 54 and 56. Furthermore, the floating piston 76 is provided with an axially drillled opening within which is placed a tubular body 94 of an insulator whose head 96 rests against the forward face of the floating piston 76 to insulate the cup-shaped retainers 74 therefrom. The cup-shaped retainer 74 has a rod 98 attached to it, as by riveting, to extend through the tubular body 94 and project slightly beyond the rear face of the floating piston 76, within the retainer 84, to be spaced from the adjusting bolt 85 and in line therewith. As can be seen, the operator-operated piston 78 has a forward projection 100 which is in line with the retainer 84 and spaced therefrom a distance normally slightly in excess of the space between the rear end of the rod 98 and the head of the adjusting bolt 85. It should also be observed that the forwardly projecting walls of the cup retainer 74 extend for a distance that will permit the bottoming on the housing 32 slightly prior to the seal 90 reaching the port 60, which will be normally in excess of one-half of the permitted distance for the travel of the floating piston 76.

Going back now, prior to passing on to the operation of the master cylinder and the indicating system connected therewith, the latching relay 22 comprises a solenoid switch including a coil 102 that cooperates with a plunger 104 of a switch arm 106 having a switch contact 108 which upon actuation of the coil 102 will engage another switch contact 110 to communicate a ground connection 112 to a lead 114 leading to the light 24. Upon actuation of the switch arm 106 as by the action of the coil 102 on the plunger 104, a resiliently biased latching pawl 116 permits the passage of the arm 106 and thereafter locks the arm 106 so that contacts 108 and 110 are closed to maintain the light 24 on so long as the ignition switch 36 is in the "ON" position connecting the positive side of the battery 34 to the light 24.

*Operation*

The vehicle operator upon depressing the brake pedal 12 will move pistons 78 and 76 simultaneously in that the cage spring 80 is heavier than the return spring 72 to close off the compensating ports 50 and 52. If the system is capable of developing a normal pressure for actuating the front brakes 18 and the rear brakes 20, the pistons 76 and 78 will progress down the bore 46 at a varied rate. In other words, the piston 76 will increase the pressure to the brake 20 by closing the distance between it and the end of the bore; whereas the piston 78 will close the distance between it and the floating piston 76 at the same time.

Upon there being an inadequate pressure developed by the piston 76, it will move down the bore to abut the cup retainers 74 on the housing 32 and thereby, through the springs 72, complete the ground connection for the lead 26. If the ignition switch is in the "ON" position, this will energize the coil 102 and pull the plunger 104 of the switch arm 106 downwardly to close the contacts 108 and 110 which will be thereafter held in the closed position by the spring biased latching pawl 116 so that the light 24 will go on and remain on so long as the ignition switch 36 is on. This will give the operator of the vehicle a visual indication that he has a failure in his braking system and that he must immediately proceed to have the failure discovered and corrected. Upon the correction of the malfunction, the latching pawl 116 is manually operated to release the switch arm 106 and open the contacts 108 and 110 to return the indicating system to its normal condition.

If, on the other hand, there has been a failure in the development of pressure for the front brakes 18, the operator-operated piston 78 will, after closing the compensating port 50 and developing some pressure to the rear brakes 20, move in the bore 46 to abut the bolt 85 on the rod 98 just prior to the contact of the projection 100 with the retainer 84. This, because of a spring 72 connecting the terminal 30 with the rod 98, will complete the circuit, as aforementioned, and light the lamp 24.

In order to prevent damage to the master cylinder housing and the piston 76 or 78, the cup shaped retainer 74 should be constructed so as to permit bending whenever the retainer 74 has abutted with the housing 32 and the projection 100 is on the retainer 84 with increasing pressure still being applied to the brake pedal 12.

Having fully described an operative construction embodying the principles of my invention, it is now my desire to set forth the coverage intended by these Letters Patent as follows:

I claim:

1. A master cylinder including switch means to indicate malfunction comprising:
    a housing having an open end bore therein;
    floating piston in said bore having a first portion of the switch means operatively connected thereto;
    operator-operated piston in and closing said bore, said operator-operated piston having a second portion of said switch means operatively connected thereto; and
    a third portion of said switch means being mounted on said housing and resiliently connected to said first portion to provide a common terminal for connection with an indicator means.

2. A master cylinder according to claim 1 wherein said first portion of said switch means includes an insulating sleeve means assembled to said floating piston within an axial bore through same and a rod extending through said sleeve to project beyond the ends of said floating piston with a face on one end of said rod cooperating with a return spring for said first and second pistons.

3. A master cylinder according to claim 2 wherein said third portion is characterized as an insulated switch terminal having means to cooperate with said return spring to complete the connection of said first portion to said third portion.

4. A master cylinder according to claim 3 wherein said second portion of said switch means is characterized as an adjusting member for a cage spring assembly connecting said first and second pistons.

5. A master cylinder according to claim 1 wherein said third portion is characterized as an insulated switch terminal having means to cooperate with a return spring to complete the connection of said first portion to said third portion.

6. A master cylinder according to claim 5 wherein said first portion of said switch means includes an insulating sleeve means assembled to said floating piston within an axial bore through same and a rod extending through said sleeve to project beyond the ends of said floating piston with a face on one end of said rod cooperating with said return spring for said first and second pistons.

7. A master cylinder according to claim 6 wherein said second portion of said switch means is characterized as an adjusting member for a cage spring assembly connecting said first and second pistons.

8. A master cylinder and indicating system therefor comprising:
    a housing having an open end bore therein;
    first piston means in said bore and operatively connected to said housing to assume a rearward position in said bore;
    second piston means in said bore and operatively connected to said first piston means to normally rest adjacent the open end of said bore and be spaced from said first piston means;
    first switch means having portions operatively connected to said first and second piston means;
    second switch means affixed to said housing for operative connection with said first piston means;
    latching relay means operatively connected to said first and second switch means;
    indicator means operatively connected to said latching relay means; and
    a power source operatively connected to said indicator means and said first and second switch means such that said indicator means is actuated by operation of said first switch means and said second switch means whenever said means to develop separate pressures has been operated beyond a point where adequate pressures should have and have not developed to oppose such travel.

9. An indicator system for a fluid pressure system having means to develop separate fluid pressures comprising:
    first switch means within said means to develop separate fluid pressures;
    second switch means operatively connected to said means to develop separate fluid pressures;
    latching relay means operatively connected to said first and second switch means;
    indicator means operatively connected to said latching relay means; and
    a power source operatively connected to said indicator means and said first and second switch means such that said indicator means is actuated by operation of said first switch means and said second switch means whenever said means to develop separate pressures has been operated beyond a point where adequate pressure should have developed to oppose such travel.

10. An indicator system according to claim 9 and further characterized in that the operative connection of said power source to said first and second switch means is by a terminal on said housing common to said first and second switch means.

11. An indicator system according to claim 9 and further comprising a test circuit and actuator between said indicator and said power source.

References Cited

UNITED STATES PATENTS

| | | | |
|---|---|---|---|
| 3,228,194 | 1/1966 | Blair | 60—54.5 |
| 3,358,446 | 12/1967 | Wortz | 60—54.5 |

EVERETTE A. POWELL, JR., *Primary Examiner.*

ROBERT R. BUNEVICH, *Assistant Examiner.*